Figure 1:
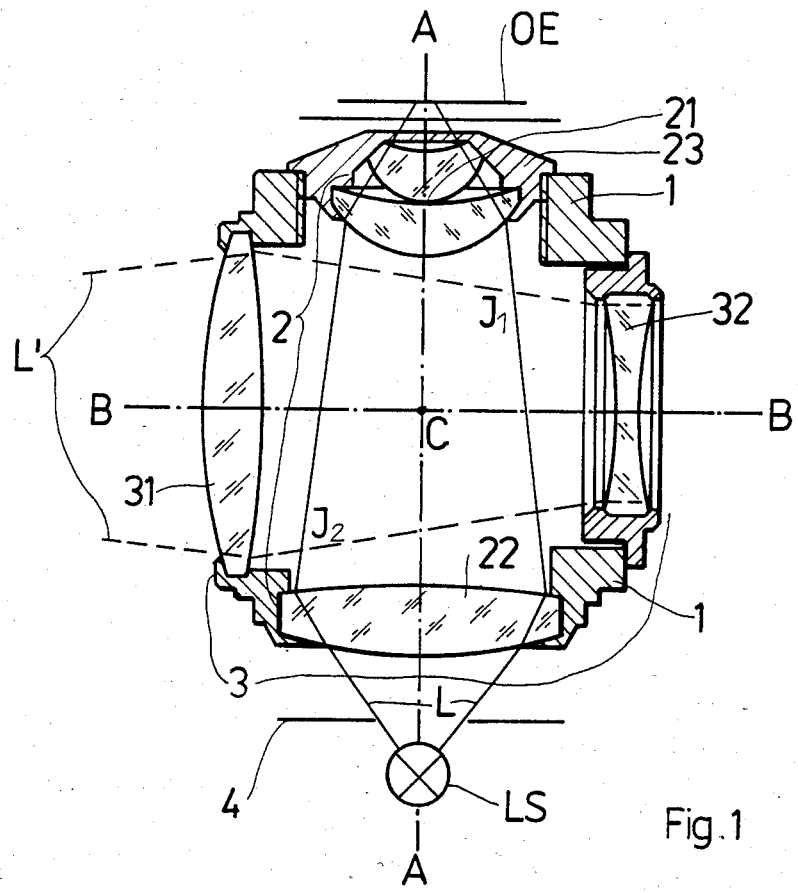

United States Patent [19]

Freiberg et al.

[11] Patent Number: 4,597,645
[45] Date of Patent: Jul. 1, 1986

[54] CONDENSER LENS SYSTEM FOR MICROSCOPES

[76] Inventors: Klaus Freiberg, 52, Buttstädter Strasse, Niederrossla; Hans Müller, 19, Bernhard-Schultze-Strasse, 6900 Jena, both of German Democratic Rep.

[21] Appl. No.: 353,958

[22] Filed: Mar. 24, 1982

[30] Foreign Application Priority Data

May 28, 1981 [DD] German Democratic Rep. ... 230359

[51] Int. Cl.⁴ .............................................. G02B 21/06
[52] U.S. Cl. ..................................................... 350/526
[58] Field of Search ................................ 350/523–528, 350/520, 507, 519, 422

[56] References Cited

U.S. PATENT DOCUMENTS

| | | | |
|---|---|---|---|
| 1,995,599 | 3/1935 | Bauersfeld | 350/526 |
| 3,813,172 | 5/1974 | Walker et al. | 350/520 |
| 3,833,283 | 9/1974 | Stankewitz | 350/526 |
| 4,195,903 | 4/1980 | Kawase et al. | 350/520 |
| 4,384,200 | 5/1983 | Taira | 350/526 |

FOREIGN PATENT DOCUMENTS

| | | | |
|---|---|---|---|
| 739599 | 9/1943 | Fed. Rep. of Germany | 350/526 |
| 483633 | 4/1938 | United Kingdom | 350/523 |

Primary Examiner—William H. Punter

[57] ABSTRACT

The invention relates to a condenser lens system for microscopes for uniformly illuminating an object field of a microscope objective. The condenser lens system is constituted of at least two individual condenser lenses in a common lens mount, said two lenses having an optical axis each which intersect in a common interspace included by the individual lens members in spaced relation. The point of intersection of the condenser lens system is the point of rotating the entire system to insert the individual condenser lenses required into an illumination beam.

1 Claim, 2 Drawing Figures

CONDENSER LENS SYSTEM FOR MICROSCOPES

The invention relates to a condenser lens system for microscopes constituted of at least two condenser lenses the optical axes of which are at right angles to each other and which become effective by rotating the condenser lens system about the point of intersection of the two axes to insert the respective condenser lens into an illumination beam.

A microscope condenser lens has to ensure a uniform illumination of the light field of a microscope objective and a homogeneous brightness of the latter.

Since the size of the apertures and of the object fields are different due to the different imaging beams shaped by the different microscope objectives used the changing of an objective also requires the changing of the condenser lens in order to adapt the aperture of the illumination beam and the object field to the aperture and the object field of the objective.

Such an adaption is conventionally obtained by inserting lenses or lens systems into, considered in the direction of light propagation, the illumination beam in front of or behind the condenser lens.

The insertion of such lenses or lens systems into the path of beams is obtained by respective changeover systems. Furthermore, it is known to changeover condenser lenses with respect to the aperture of the objective by condenser turrets. To this end the individual condenser lenses which correspond to a respective aperture and to a respective object field of the microscope objective are arranged on a revolving piece and can be inserted into the observation path of beams as required.

Furthermore, zoom condenser lenses are known. The adaption of the aperture of the zoom condenser lens and of the object field is obtained by displacing the optical components of the condenser lens about an optical axis. The above-mentioned systems are disadvantageous since the diameter of the object field is limited.

It is a further disadvantage that a considerable expenditure for optical and mechanical elements is required to insert the above systems into a path of beam.

It is an object of the present invention to obviate the above disadvantages.

It is a further object of the present invention to provide a comparatively simple and inexpensive condenser lens system for uniformly illuminating a considerably large object field of a microscope objective.

It is a further object of the invention to provide a condenser lens system of at least two individual condenser lenses having a common optically effective interspace.

These and other objects are realised in a condenser lens system for microscopes constituted of at least two condenser lenses in a common lens mount, each of the individual condenser lenses is constituted of a condenser head and an optical member in opposition to a light source, an optical interspace common to both individual condenser lenses is included by the condenser heads on the one hand, and the optical members, on the other hand.

Each of said condenser lenses has an optical axis, the two axes have a point of intersection in the interspace. Preferably, the lens mount is provided with means for rotating the entire condenser lens system about an axis or rotation which coincides with an axis passing through the point of intersection at right angles to a plane defined by the optical axes of both individual condenser lens systems.

The common optical effective interspace within the condenser lens system permits an insertion of the required condenser lens into a path of beams by a simple rotation of the system. Due to the position of the interspace in the condenser lens system the overall dimensions of the system permit a minimum diameter of the turning circle of the entire condenser lens system.

Figure 2:
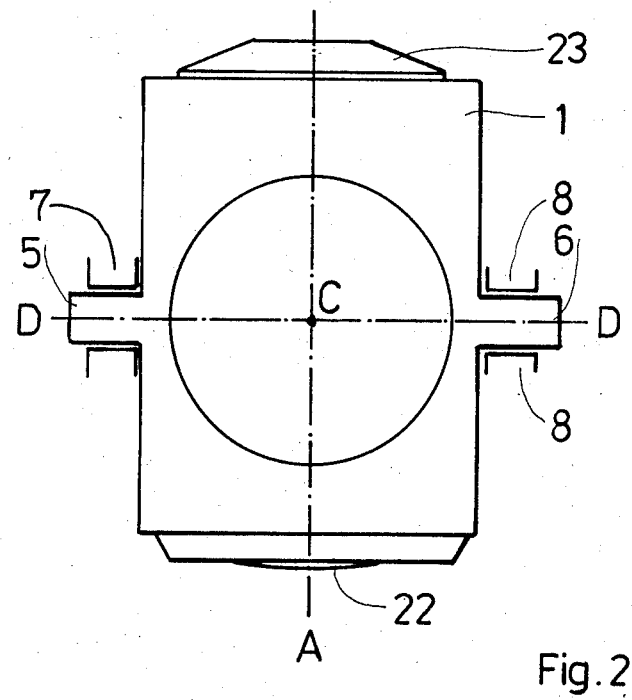

In order that the invention may be more readily understood reference is made to the accompanying drawings which illustrate diagrammatically and by way of example one embodiment thereof and where FIG. 1 is a schematical sectional view of a condenser lens system, and FIG. 2 a schematical view of a lens mount of a condenser lens system.

In the Figs. like numbers refer to like components. In FIG. 1 in a lens mount 1 a first condenser lens 2 is arranged about an optical axis A—A comprising a condenser lens head 21, in opposition to an object plane O—E of a not shown microscope, and a biconvex lens 22. The condenser lens head 21 is secured to a mount 23 which is attached to the lens mount 1. The biconvex lens 22 is secured to the lens mount 1.

The condenser lens 2 components are located in a spaced relation thus including an optical interspace $J_1$ delineated by a schematically represented light beam L originating from a light source LS in opposition to the biconvex lens 22 on the one hand, and by the condenser lens head 21 and the biconvex lens 22, on the other hand.

An aperture 4 is inserted into the light beam L between the light source LS and the biconvex lens 22.

In the lens mount 1 a second condenser lens 3 comprises about an optical axis B—B a condenser lens head 31 constituted of a biconvex lens 31, and a biconcave lens 32 both being in mutal spaced relation including an optical interspace $J_2$ delineated by dashed lines L', on the one hand, and the opposing faces of the lenses 31 and 32.

The optical axes A—A and B—B have a point of intersection C which lies in the interspaces $J_1$ and $J_2$.

FIG. 2 shows the lens mount 1 of the condenser lens system 2, 3 which is provided with two pinions 5, 6 which are attached to the side portions of the lens mount 1 in symmetrical relation to each other about an axis of rotation D—D. The pinions 5, 6 are seated for rotation in a first bearing 7 and a second bearing 8, respectively.

The axis of rotation D—D is at right angles to a plane defined by the axis A—A and B—B, passing the point of intersection C.

In operation, the common interspaces $J_1$, and $J_2$ of the condenser lenses 2, 3 permit a rotation of the entire condenser lens system about 90° without the necessity of lowering the latter as commonly required.

The condenser lens 2 transmits the light beam L from the light source LS via the aperture 4, the lens 22, the interspace $J_1$, the condenser head 21 into the object plane OE.

The condenser lens 2 produces a maximal aperture, whereas the condenser lens 3 produces a maximum illumination field.

When the latter is required, the condenser lens 3 is inserted into the light beam L by rotating the entire system by 90° about the axis of rotation D—D by a simple lever operation (not represented). Thus it is feasible to adapt any microscope objective to the required illumination field size and aperture, respectively.

The inventional optical system is not restricted to the above embodiment, so it feasible to employ any suitable seating and rotation means.

Furthermore, it is feasible to have a plurality of optical condenser lenses each with an optical axis which intersect in one and the same point of intersection, which is the point of rotation. In this event, the system is seated in spherical segments or any other suitable means.

We claim:

1. A condenser lens system comprising in a lens mount,
   at least a first and a second condenser lens, said first condenser lens having a first optical axis, said second condenser lens being constituted of a condenser head and a lens member in spaced relation including a first interspace, said second condenser lens being constituted of a first lens and a second lens at spaced relation including a second optical interspace, said first interspace and said second interspace being substantially coincident, said first optical and said second optical axis intersecting in the interspaces and defining a plane,
   means for rotating said lens system about an axis of rotation, said means for rotating said lens system being symmetrically provided at said lens mount about said axis of rotation, said axis of rotation intersecting said point of intersection at right angles to said plane,
   seating means being provided for seating said means for rotation.

* * * * *